US011507996B1

(12) United States Patent
Zhou et al.

(10) Patent No.: US 11,507,996 B1
(45) Date of Patent: Nov. 22, 2022

(54) CATALOG ITEM SELECTION BASED ON VISUAL SIMILARITY

(71) Applicant: Amazon Technologies, Inc., Seattle, WA (US)

(72) Inventors: Xiaolei Zhou, Beijing (CN); Chang Liu, Seattle, WA (US); Lin Lin, Beijing (CN); Frederick Ian St Johnston, Beijing (CN)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 16/738,948

(22) Filed: Jan. 9, 2020

(51) Int. Cl.
G06Q 30/06 (2012.01)
G06N 5/04 (2006.01)
G06N 20/00 (2019.01)

(52) U.S. Cl.
CPC ........... *G06Q 30/0631* (2013.01); *G06N 5/04* (2013.01); *G06N 20/00* (2019.01); *G06Q 30/0603* (2013.01); *G06Q 30/0643* (2013.01)

(58) Field of Classification Search
CPC .............................................. G06Q 30/06–08
See application file for complete search history.

(56) References Cited

U.S. PATENT DOCUMENTS

| 8,364,559 | B1* | 1/2013 | Bhosle | G06Q 30/00 |
| | | | | 705/26.63 |
| 9,721,291 | B1 | 8/2017 | Kennis | |
| 10,109,051 | B1 | 10/2018 | Natesh et al. | |
| 10,176,198 | B1 | 1/2019 | Dhua et al. | |
| 10,229,347 | B2 | 3/2019 | Harary et al. | |
| 10,275,820 | B2 | 4/2019 | Guo et al. | |
| 10,282,431 | B1 | 5/2019 | Bhotika et al. | |
| 10,395,143 | B2 | 8/2019 | Harary et al. | |
| 10,467,526 | B1 | 11/2019 | Appalaraju et al. | |
| 2011/0238659 | A1* | 9/2011 | Chittar | G06F 16/5838 |
| | | | | 707/724 |
| 2015/0161480 | A1* | 6/2015 | Ruzon | G06V 10/443 |
| | | | | 382/197 |

(Continued)

OTHER PUBLICATIONS

Google says machine learning is the future. So I tried it myself, Alex Hern Jun. 28, 2016 (Year: 2016).*

(Continued)

Primary Examiner — Ming Shui
(74) Attorney, Agent, or Firm — Robert C. Kowert; Kowert, Hood, Munyon, Rankin & Goetzel, P.C.

(57) ABSTRACT

Methods, systems, and computer-readable media for catalog item selection based on visual similarity are disclosed. A similarity detection system selects candidate items for an unavailable item in a catalog. The candidate items are selected from one or more item categories in which the unavailable item is classified. The system determines respective similarity scores for at least some of the candidate items with respect to the unavailable item. For a particular candidate item, the similarity score is determined based at least in part on a visual similarity between an image of the unavailable item and an image of the particular candidate item. The system selects, from the candidate items, a set of visually similar items to the unavailable item based at least in part on the similarity scores. The visually similar items are available to the user.

20 Claims, 9 Drawing Sheets

(56) References Cited

U.S. PATENT DOCUMENTS

| | | | |
|---|---|---|---|
| 2015/0220530 A1* | 8/2015 | Banadaki | G06F 16/90 |
| | | | 707/723 |
| 2016/0098784 A1* | 4/2016 | Ainsworth, III | G06Q 30/0643 |
| | | | 705/26.7 |
| 2017/0372169 A1 | 12/2017 | Li | |
| 2018/0012110 A1* | 1/2018 | Souche | G06F 16/58 |
| 2020/0401851 A1* | 12/2020 | Mau | G06K 9/6292 |

OTHER PUBLICATIONS

Recommended For You: How machine learning helps you choose what to consume next, Jennifer Wei, Aug. 28, 2017 (Year: 2017).*
Machine Learning: What it is and why it matters, SAS, Jan. 7, 2014. (Year: 2014).*

* cited by examiner

CATALOG ITEM SELECTION BASED ON VISUAL SIMILARITY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Web servers backed by distributed systems may provide stores that offer goods and/or services to consumers. For instance, consumers may visit a website to view and purchase goods and services offered for sale by a set of vendors. Some web-accessible stores include large electronic catalogs of items offered for sale. For each item, such electronic catalogs typically include at least one product detail page that specifies various information about the item, such as a description of the item, one or more pictures of the item, as well as specifications (e.g., weight, dimensions, capabilities) of the item. A distributed system may include many different computing resources and many different services that interact with one another, e.g., to produce a product detail page for consumption by a client of a web server.

Figure 1:
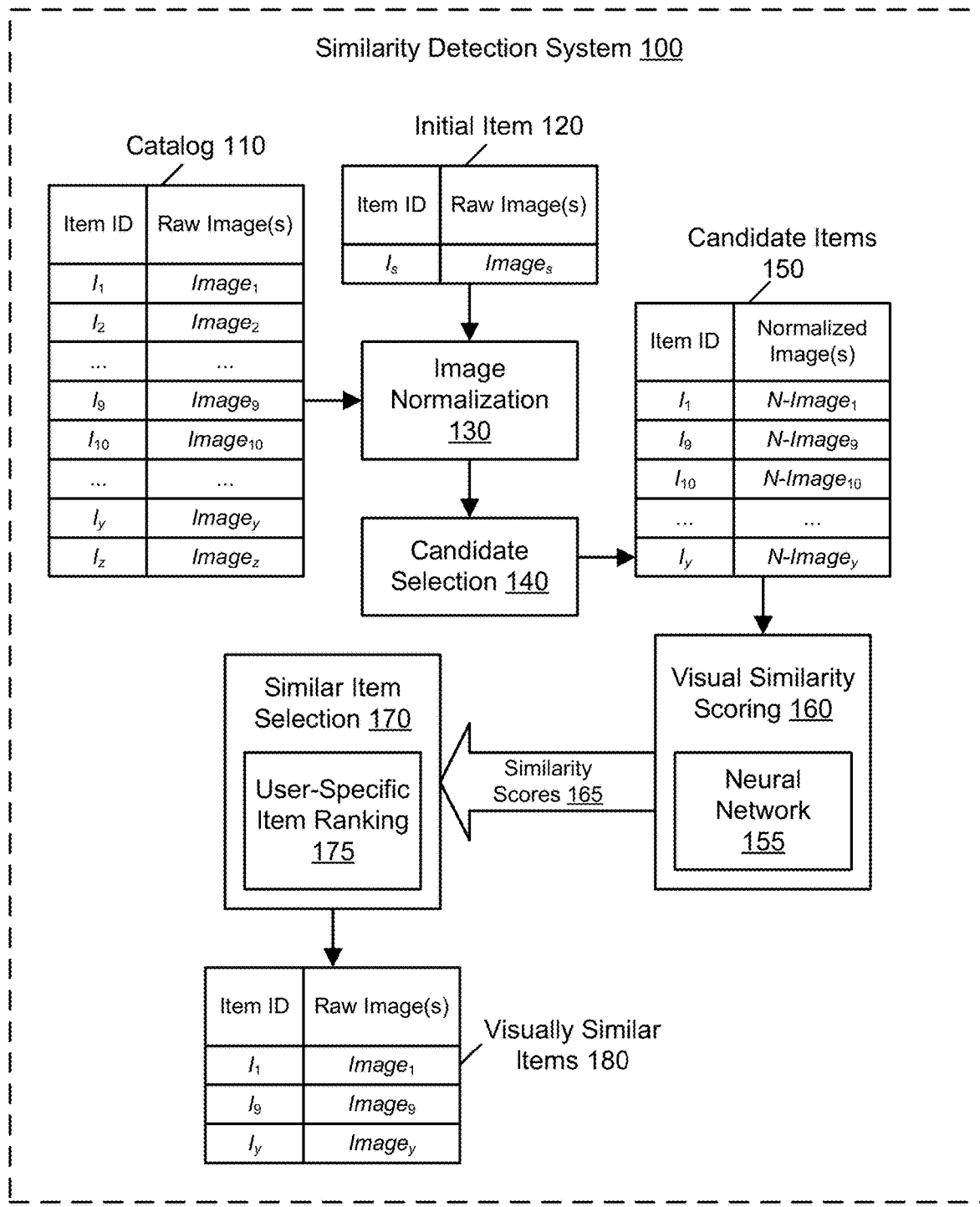
FIG. 1 illustrates an example system environment for catalog item selection based on visual similarity, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for catalog item selection based on visual similarity are described. An electronic catalog may contain many millions of different items from many different sellers. Sellers may characterize and differentiate items using titles, descriptive text, images, and so on. Customers may search the electronic catalog using search terms or browse categories of items in order to identify desired items. Customers may then purchase, rent, lease, or otherwise engage in transactions regarding particular items with sellers of those items. In some circumstances, a customer may identify a desired item such as an article of clothing or a cell phone case, but the item may not be in stock in the customer's size or may not be available to the specific customer for geographic, legal, regulatory, or other reasons. Using prior approaches, other catalog items may have been recommended to the customer using analysis of textual similarities, e.g., by comparing the title and description of the unavailable item to the titles and descriptions of other items in order to select and recommend similar items that the customer may wish to purchase instead. Similarly, other catalog items may have been recommended to the customer using analysis of purchase histories and/or browse histories of customers who also showed interest in the unavailable item. However, these approaches may yield inaccurate comparisons due to the inherent limitations of the inputs (e.g., item titles, purchase histories, and so on). These prior approaches may thus result in recommendations that fail to reflect the interests of customers, particularly for items where textual descriptions are less important than visual depictions. When customers are told that desired items are unavailable and are then presented with alternative items that are not relevant to the customers' tastes, the customers may experience frustration and may perform time-consuming additional searches or even disengage from the catalog without making any purchases.

Using techniques described herein, a similarity detection system may select, prioritize, and/or recommend alternative products based (at least in part) on analysis of product images. To ensure that comparisons are made between comparable images, product images may be normalized, e.g., by not using or ignoring irrelevant visual elements of the image, such as the image background and parts of the mannequin or person not covered by the clothing (e.g., limbs and head). The normalized product images may be used as a basis for automatically determining the visual similarities between pairs of products in the catalog. In some embodiments, a neural network may be trained using the normalized images so that the neural network can be used to generate real-time inferences about visual similarities of image pairs. When a customer views a product in the catalog, but the product is not in stock in a selected size or not available to the specific customer for some other reason, one or more alternative products may be identified for the customer using entity-matching techniques based (at least in part) on the visual similarity of the alternative products in comparison to the unavailable product. Product recommendations may be generated using analysis of visual similarity for products whose appearance is particularly important, e.g., clothing, apparel, and other textiles ("softlines"); home décor; furniture; mobile phone cases; and so on. For such items, the similarity detection system may provide more accurate matches for attributes such as shape, style, and color. For example, if the customer seeks to buy a black dress from a particular brand, but the dress is unavailable for purchase in the a selected size or region, the similarity detection system may determine a set of visually similar black dresses, e.g., by ranking product listings according to their visual similarities and presenting the top N products in the ranking. In some embodiments, the product recommendations may also be selected and/or prioritized based (at least in part) on the available sizes of the alternative products, customer purchase histories, customer browse histories, price, color, material, availability and so on. By using analysis of product images to provide selections of catalog items that are more relevant to individual customers' tastes and interests, the similarity detection system may increase customer engagement and satisfaction.

The task of navigating a large electronic catalog of items (e.g., a catalog with millions or billions of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories and requires the user to navigate through several levels of browse nodes or category pages to arrive at the subcategory of interest. Further, in many cases, the items of interest are not accurately or intuitively categorized, and the user is required to perform additional navigation or keyword searching. Thus, the user frequently has to perform numerous navigational steps to arrive at the catalog page or "item detail page" of interest. Similarities/suggestions/recommendation techniques and user interfaces of the type disclosed herein significantly reduce this problem, allowing users to locate items of interest with fewer steps. For example, in the embodiments described herein, when the user is presented with one or more item similarities, each item similarity includes, or is in the form of, a link to the catalog's item detail page for the corresponding item, allowing the user to navigate directly to this page. Each similarity thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the items via the browse tree or via searching. This can be particularly true for computing devices with small screens, where fewer items can be displayed to the user at a time and thus navigation of larger volumes of items is more difficult.

As one skilled in the art will appreciate in light of this disclosure, embodiments may be capable of achieving certain technical advantages, including some or all of the following: (1) improving the ability of computers to display relevant information to users in a space-constrained user interface, e.g., by displaying items that are most relevant to an unavailable item and not displaying less relevant items; (2) reducing the use of computers (e.g., computational resources and network resources) that implement an electronic catalog by providing relevant product recommendations without requiring users to perform additional searches of the catalog; (3) reducing the use of computers (e.g., computational resources and network resources) for performing entity-matching tasks by selecting a limited set of candidate items from a large catalog of items; (4) improving the accuracy of entity-matching tasks using analysis of visual similarities instead of textual analysis only; (5) improving the speed of performing entity-matching tasks by using machine learning techniques to generate similarity scores in real-time or near-real-time; (6) improving the accuracy of entity-matching tasks for individual customers of a catalog using personalization data such as brand affinity, customer purchase history, and customer view history; (7) improving the quality of item descriptions in a catalog by using analysis of visual similarities to identify comparable products in other catalogs (e.g., websites) and then copying information describing those comparable products; (8) improving the accuracy of entity-matching tasks by matching at the child product ID level rather than the parent product ID level, e.g., where child product IDs represent items in particular sizes, colors, and other varieties; and so on.

FIG. 1 illustrates an example system environment for catalog item selection based on visual similarity, according to some embodiments. A similarity detection system 100 may perform entity-matching tasks based on visual similarities between entities. The similarity detection system 100 may take a set of items from an electronic catalog 110 and produce a smaller set of items 180 that have a high degree of visual similarity to a particular item 120. The item 120 may be referred to as an initial item. In some embodiments, the initial item 120 may be selected or identified by a user of the catalog 110. For example, the user may represent a potential customer who has chosen to view a product detail page for the initial item 120. The item 120 may be out of stock or otherwise unavailable to the user. For example, the item 120 may represent an article of clothing, and the article of clothing may be unavailable (e.g., out of stock or not offered) in a chosen size. The system 100 may identify similar products at the child product ID level and not necessarily at the parent product ID level. Child product IDs may represent individual sizes, colors, or other varieties of an item. For example, the item 120 may represent a child item (a clothing item in a particular size and color as identified by a child item identifier) of a parent item (all sizes and color combinations of the clothing item, as identified by a parent item identifier) in the catalog. As another example, the item 120 may be unavailable to the particular user for geographic, legal, regulatory, or other reasons, e.g., because a vendor of the item does not sell to particular locales or does not offer the product in a particular size.

When the initial item 120 is unavailable or otherwise nonviable, one or more alternative items may be identified for the customer based (at least in part) on the visual similarity of the alternative items in comparison to the unavailable item. Using the similarity detection system 100, product recommendations may be generated using analysis of visual similarity for products whose appearance is particularly important, e.g., clothing, apparel, and other textiles ("softlines"); home décor; furniture; mobile phone cases; and so on. For such items, the similarity detection system 100 may provide more accurate matches for attributes such as shape, style, and color. The selected items 180 may be referred to as visually similar items with respect to the initial item 120. At least some of the visually similar items 180 may be presented to the user as alternatives to the unavailable item 120, e.g., in a user interface for the catalog 110. In some embodiments, the user may be able to select one of the visually similar items 180 in the user interface for viewing, adding to the user's cart, and/or purchasing. For example, if the customer seeks to buy a black dress, but the dress is unavailable for purchase in a particular size or locale, the similarity detection system 100 may determine a set of visually similar black dresses using analysis of product images for the initial item and a set of candidate items within the same clothing-based product category. At least some of the visually similar dresses may be shown to the user in a user interface (e.g., using product images and optionally other descriptive information), and the user may be permitted to select one or more of the visually similar dresses for a transaction.

As discussed above, the catalog 110 may contain millions of descriptions of different items, including products such as goods (tangible and intangible) and services. The catalog 110 may contain many items from many different sellers. Sellers may characterize and differentiate items using titles, descriptive text, images, and so on. For example, as shown in FIG. 1, the catalog 100 may include item $I_1$ depicted by $Image_1$, item $I_2$ depicted by $Image_2$, item $I_9$ depicted by $Image_9$, item $I_{10}$ depicted by $Image_{10}$, item $I_y$ depicted by $Image_y$, item A depicted by Image z, and so on. The catalog 100 may also include the initial item $I_S$ depicted by $Image_S$. A particular item may be classified in one or more item categories. Categories may be organized in a hierarchy, e.g., with some categories representing root nodes in a tree-like data structure, other categories representing intermediate nodes with both parents and children, and yet other categories representing leaf nodes with no children. Customers may search the electronic catalog 110 using search terms or may browse categories of items in order to identify desired items.

To begin identifying visually similar items to the initial item 120, the system 100 may select a plurality of candidate items 150 from within the same category or department as the initial item. Using a component for candidate selection 140, the candidate items 150 may be selected based on one or more attributes such as product type, size (e.g., such that candidate items are available in a particular size), availability/buyability, color, material, brand affinity, and so on, such that the resulting set of similar items is both available to the user and relevant to the user's interests. In some embodiments, the candidate items 150 may be selected based (at least in part) on analysis of the textual descriptions (e.g., titles) of the candidate items in comparison to a textual description (e.g., title) of the initial item 120. For example, the candidate items 150 may be those items from the same category or department in which the initial item 120 is classified that also have at least N % overlap in the words included in their titles. The visually similar items 180 may be drawn from the set of candidate items 150. The candidate items 150 may represent a much smaller set than the set of all items in the catalog 110 but a larger set than the set of visually similar items 180. By performing analysis of visual similarity on a smaller set of candidate items 15150 rather than the entire catalog 110, the system 100 may conserve the use of computational resources and return results more quickly.

The similarity detection system 100 may perform the analysis of visual similarity on comparable images for greater accuracy of comparison. To ensure that comparisons are made between comparable images, product images may be normalized using a component for image normalization 130. Normalized images may be modified to have standard dimensions and/or a standard color depth or RGB format. Normalized images may be generated by removing irrelevant image elements and isolating image elements of the products themselves. For example, for clothing items, image elements such as limbs, hands, necks, heads, or other exposed parts of human models may be identified and removed in the normalized images. As another example, image elements of a background may be removed in the normalized images. In some embodiments, image elements for product packaging may be removed in the normalized images. In some embodiments, image elements for textual labels, brand logos (not on the products themselves), or other extraneous marketing graphics may be removed in the normalized images. In some embodiments, the normalized images may have backgrounds in the same color (e.g., black). The normalized product images may be used as a basis for automatically determining the visual similarities between pairs of products in the catalog.

In some embodiments, deep learning or machine learning techniques may be used to generate the normalized images based on the product images in the catalog 110. For example, the machine learning techniques may include using an object classifier to identify and remove parts of human models for clothing items. The machine learning model(s) may be trained using many product images to recognize parts, backgrounds, and other extraneous image elements to be removed in normalized images. The object classifier may identify classes of parts such as whole body, upper body, and lower body. The object classifier may use a pre-defined mapping between body part and rectangular shape to get the correct area that includes human skin, and a GrabCut algorithm may be used to remove the skin parts from the image. The background color of the image may then be changed, e.g., to black.

The similarity detection system 100 may select, prioritize, and/or recommend alternative products based (at least in part) on analysis of normalized product images. The catalog may include one or more images descriptive of the initial item 120 and one or more images descriptive of the candidate items. For at least some of the candidate items, the system 100 may perform an analysis of the visual similarity between a normalized image of the initial item 120 and a normalized image of the candidate item. For example, the candidate items 150 may include item h depicted by normalized image $N\text{-}Image_1$, item $I_9$ depicted by normalized image $N\text{-}Image_9$, item ho depicted by normalized image N-Image$_{10}$, item I$_z$ depicted by normalized image N-Image$_z$, and so on. The analysis of visual similarity may seek to identify those of the candidate items that have a higher degree of visual similarity to the initial item 120.

A component for visual similarity scoring 160 may produce similarity scores 165 for at least some of the candidate items 150. The analysis of visual similarity may use a machine learning model (e.g., a neural network 155) that has been trained using many product images to output similarity scores for pairs of images. In some embodiments, the candidate items 150 may be characterized using similarity scores that are based (at least in part) on the visual similarity of individual candidate items with respect to the initial item 120 according to their respective product images. Using a component 170 for similar item selection, some of the candidate items 150 may be selected for the set of visually similar items 180. In some embodiments, the candidate items above a particular threshold value of the similarity score (e.g., at least 50% similar) or meeting some other criteria may be added to the set of visually similar items 180, and the remaining candidate items may be disregarded for inclusion in the set of visually similar items. In some embodiments, the top N candidate items in the ranking of the similarity scores may be added to the set of visually similar items 180, and the remaining candidate items may be disregarded for inclusion in the set of visually similar items.

In some embodiments, the set of visually similar items 180 may be ranked according to various attributes such as brand, color, material, and price range, where the various attributes are weighted according to analysis of the customer's usage history (e.g., page views, items added to cart, items purchased). Using a user-specific item ranking 175, the selection of the visually similar items 180 may be personalized for individual customers. In some embodiments, candidate items may be ranked, prioritized, or filtered according to one or more other criteria, such as size, price, color, material, brand affinity, availability/buyability, and so on. For example, candidate items that are not available in a desired size (or unavailable to the user for any other reason) may be excluded from the set of visually similar items that is presented to the user. As another example, the user may have a range of acceptable prices, and candidate items that are not within that price range may be excluded from the set of visually similar items that is presented to the user. The user's price range may be specified by user input or may be determined using automated analysis of the user's browsing or purchase history. As yet another example, the system 100 may maintain a brand affinity graph representing relationships between brands. Edges in the graph may be determined using customer usage histories for the catalog, e.g., customer purchase histories, customer page view or browse histories, customer add-to-cart histories, and so on. Information from the brand affinity graph may be used to prioritize and/or rank the candidate items such that items from brands with stronger affinities to the brand of the initial item 120 may be given higher prioritization. As a further example, the system 100 may extract color palettes for the initial item image and the candidate item images, and automated analysis of the color palettes may be used to prioritize or filter the candidate items such that the candidate items represent one or more similar colors with respect to the initial item 120.

In some embodiments, the similarity scores may be determined using one or more techniques for machine learning. Machine learning techniques may be implemented using one or more systems that learn from data, identify patterns, and make predictions or other decisions with minimal human intervention (e.g., after human input during an initial configuration phase such as model training). Machine learning may include generating and using one or more models that can programmatically output results (e.g., visual similarity scores) based (at least in part) on input (e.g., images depicting items). Such a model may undergo a training process (e.g., using a training data set) such that it learns patterns sufficient to make inferences about future events. As discussed above, one or more machine learning models may be used to isolate products within product images and produce normalized images where extraneous image elements have been removed. One or more machine learning models may be used to determine similarity scores for product images, e.g., images on which a model was not trained. The machine learning model(s) may be implemented using one or more computer vision libraries such as OpenCV. In some embodiments, a neural network may be trained using the normalized images for other items in the same product category, for the same brand, and of the same product type as the initial item. The neural network may then be used to classify or assess the visual similarity of two items within that category by producing a similarity score representing the visual similarity of the two items (according to their normalized images). In some embodiments, the neural network or other machine learning technique may be used to produce similarity scores for pairs of images in real-time or near-real-time.

The visually similar items 180 may be selected in order to optimize the display of a relatively small number of suggested items in a space-constrained user interface element. For example, the visually similar items 180 may be used to drive a "suggested purchases" pane or widget on a product detail page associated with the catalog 110. Such an interface element may improve the experience of customers of the catalog 110, e.g., by allowing them to discover items of interest while reducing the display of less relevant items. In some embodiments, the similarity scores may be used to solicit additional user input via a graphical user interface or voice-enabled interface. For example, the system 100 may ask the user to clarify the user's preferences regarding brand, color, material, or price in order to refine a set of candidate items 150 from the catalog 110.

In some embodiments, the analysis of visual similarity may be used to identify comparable products in one or more other catalogs, e.g., webstores operated by other entities than the entity that maintains the catalog 110. Descriptive information or other attributes for the comparable products may be extracted from the other catalog(s) and then used to enhance item descriptions in the catalog 110. For example, rather than relying on machine translation to generate a description of an item that is localized for a particular region, the analysis of visual similarity may be used to extract superior product descriptions and use those superior descriptions in product detail pages (or other relevant places) in the catalog 110. As another example, such techniques may be used for price-matching purposes, e.g., by identifying prices of comparable items in other catalogs and matching or beating those prices.

Figure 9:
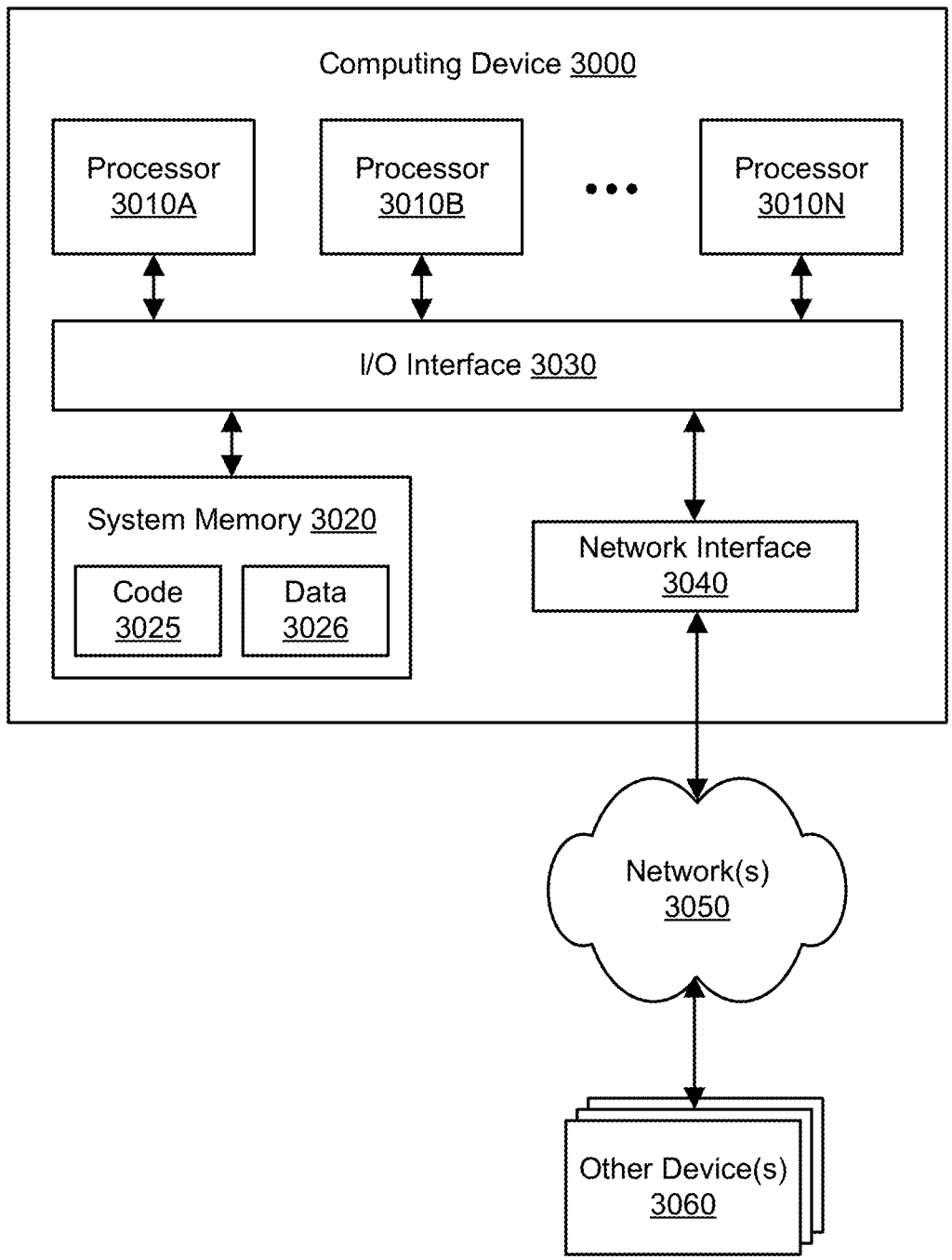
FIG. 9 illustrates an example computing device that may be used in some embodiments.

The similarity detection system 100 may be implemented using any suitable number and configuration of computing devices, any of which may be implemented by the example computing device 3000 illustrated in FIG. 9. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

One or more components of the system 100 may be implemented in a service-oriented system in which multiple services collaborate according to a service-oriented architecture. In such an environment, the system 100 may offer its functionality as a service to multiple clients. To enable clients to invoke its functionality, the system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the system 100 may be offered to clients in exchange for fees, or the cost associated with performing a selection of catalog items using the system 100 may be assessed to a responsible entity. In some embodiments, clients of the system 100 may represent different business entities than the entity that operates the system 100.

Components of the system 100 and its clients may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 may be implemented using computing resources of a provider network. The provider network may represent a network set up by an entity such as a company or a public-sector organization to provide one or more services (such as various types of network-accessible computing or storage) accessible via the Internet and/or other networks to a distributed set of clients. The provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. Aspects of the provider network may be hosted in the cloud, and the network may be termed a cloud-based provider network.

Figure 2:
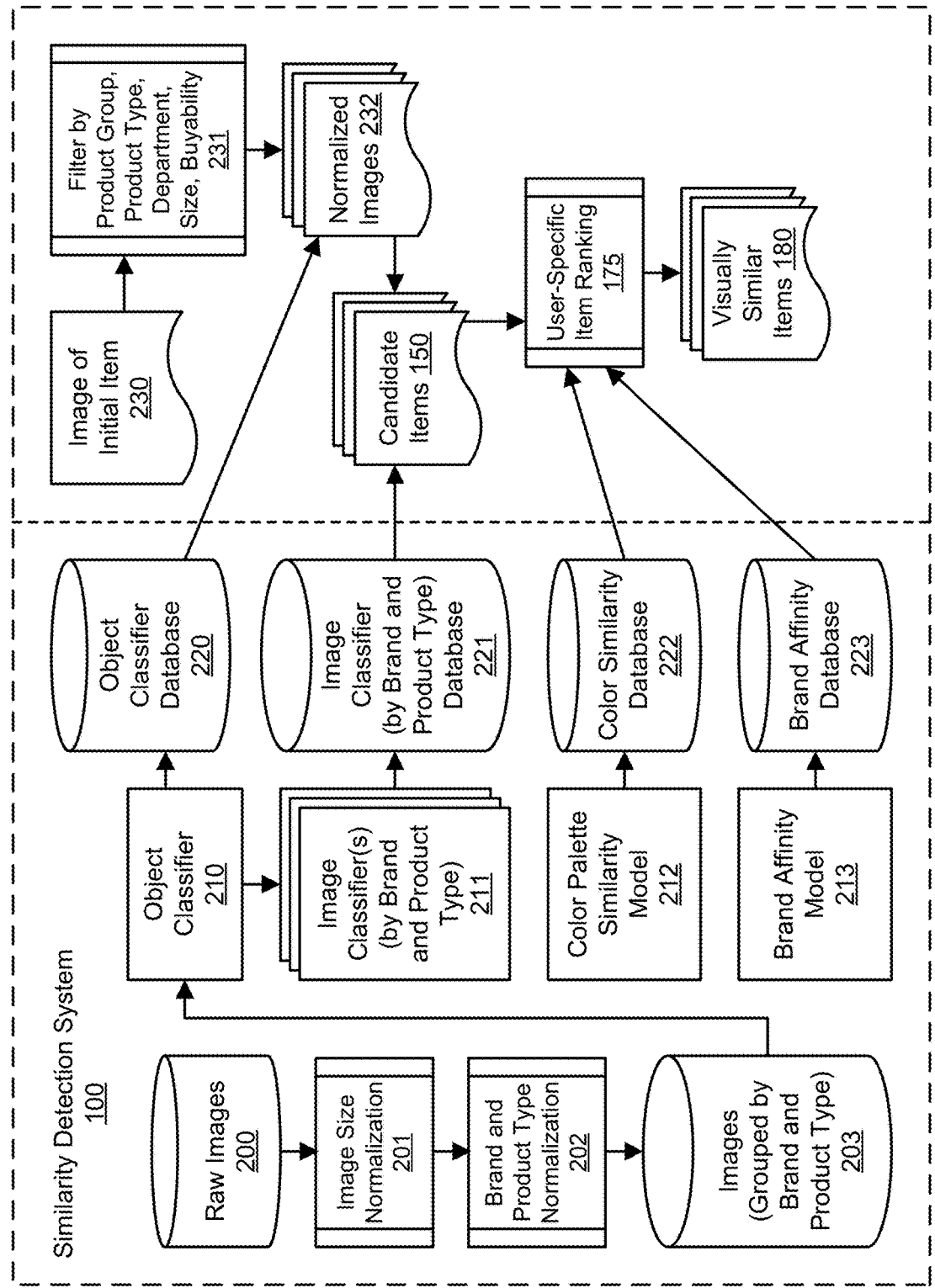
FIG. 2 illustrates further aspects of the example system environment for catalog item selection based on visual similarity, including offline and online components of the visual similarity analysis, according to some embodiments.

FIG. 2 illustrates further aspects of the example system environment for catalog item selection based on visual similarity, including offline and online components of the visual similarity analysis, according to some embodiments. A set of offline components may be used periodically (e.g., every N weeks or months) to produce a set of databases 220, 221, 222, and 223. The databases 220, 221, 222, and 223 may then be used by the set of online components to select visually similar items 180 for an initial item 120. As discussed above, raw product images 200 may undergo normalization techniques such as image size normalization 201 and brand and product type normalization 202 to produce images grouped by brand and product type 203. These images 203 may be used as input to an object classifier 210 that produces an object classifier database 220. The object classifier 210 may also be used to generate one or more image classifiers (by brand and product type) 211. The image classifier(s) 211 may be used to generate an image classifier (by brand and product type) database 221. A color palette similarity model 212 may produce a color similarity database 222. A brand affinity model 213 may produce a brand affinity database 223 that captures relationships between product brands for the catalog 110.

To find a set of visually similar items 180 for an initial item 120, an image 230 of the initial item may be provided to the system 100. Catalog items may be filtered 231 by product group, product type, department, size, buyability, and so on, in order to reduce the number of items to be visually analyzed to a manageable amount. Using the object classifier database 220, images of candidate items may be turned into normalized images 232. The image classifier database 221 may be used to generate similarity scores for the candidate items 150. The user-specific item ranking 175 may use information from the color similarity database 222 and brand affinity database 223 to rank and/or filter the candidate items according to the user's preferences. The resulting ranked and/or filtered list may represent a set of visually similar items 180 with respect to the initial item 120.

Figure 3:
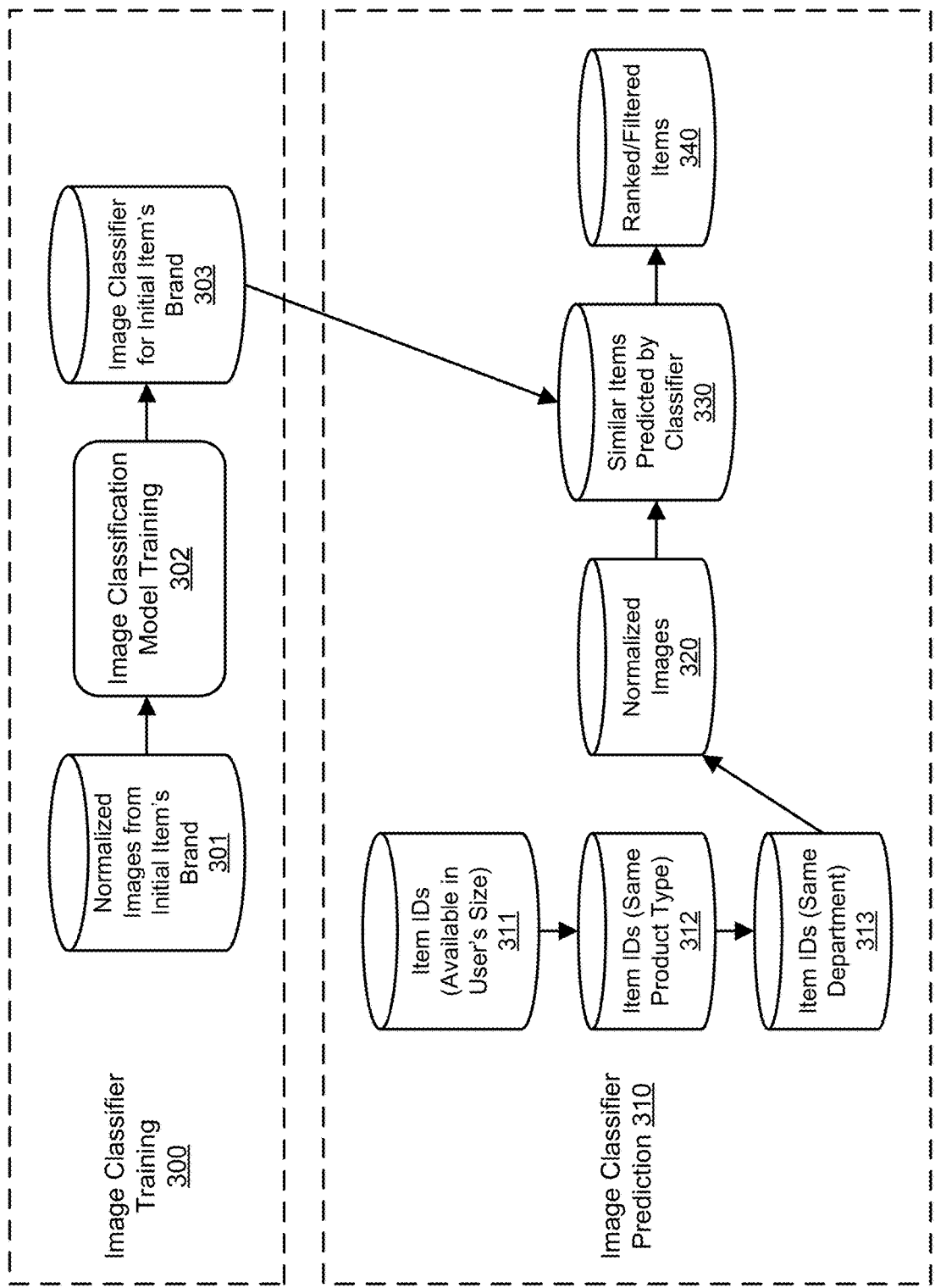
FIG. 3 illustrates further aspects of the example system environment for catalog item selection based on visual similarity, including training and use of an image classifier, according to some embodiments.

FIG. 3 illustrates further aspects of the example system environment for catalog item selection based on visual similarity, including training and use of an image classifier, according to some embodiments. An image classifier may be trained using an offline training process 300 and used to generate predictions using an online prediction process 310. In some embodiments, over-fitted deep-learning classification models may be leveraged to boost process of finding similar items. As shown in FIG. 3, normalized images 301 from the same brand and product type as the initial item may be used as input to the image classification model training process 302 to generate an image classifier 303 for the same brand and product type as the initial item. For each brand and each product type, a Resnet-50 ImageNet model may be fine-tuned to classify all items under such conditions to produce an over-fitted model that could predict items of the same brand and product type with more than 90% percent accuracy.

In some embodiments, the prediction process 310 may be implemented using graphics processing unit (GPU) resources for reduced latency of prediction. A set of all item IDs (available in as selected size) 311 may be filtered by product type to produce a set of item IDs (available, and of the same product type as the initial item) 312. That set 312 may be filtered to produce a set of item IDs (available, of the same brand, and from the same category or department as the initial item) 313. Normalized images 320 for the items in the set 313 may be used as input to the image classifier 330 to output a set of visually similar items. The visually similar items may be ranked and/or filtered as discussed above to product a set of ranked/filtered items 340.

Figure 4:
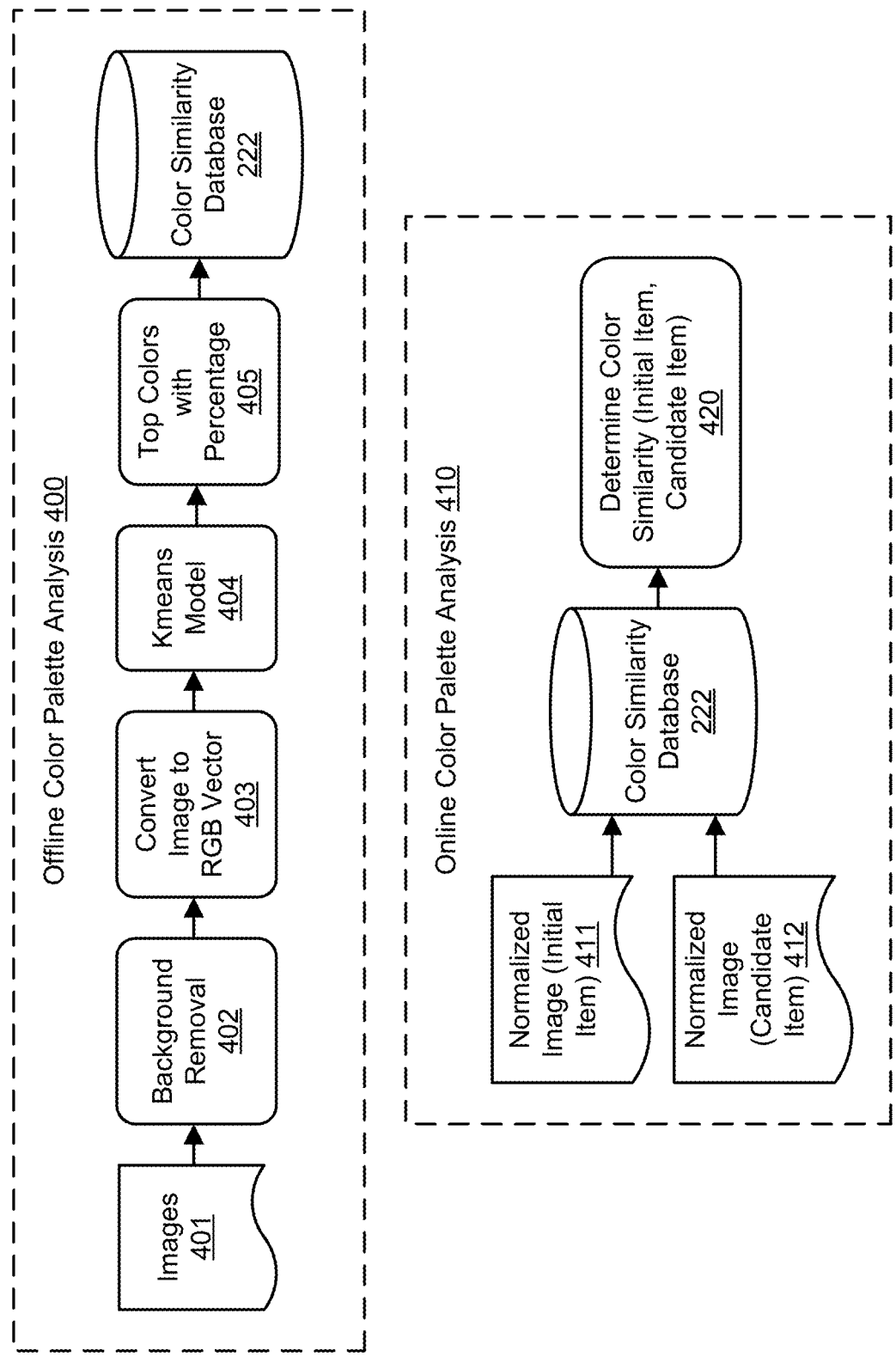
FIG. 4 illustrates further aspects of the example system environment for catalog item selection based on visual similarity, including offline and online color palette analysis, according to some embodiments.

FIG. 4 illustrates further aspects of the example system environment for catalog item selection based on visual similarity, including offline and online color palette analysis, according to some embodiments. The system 100 may extract color palettes for the initial item image and the candidate item images, and automated analysis of the color palettes may be used to prioritize or filter the candidate items 150 such that the candidate items represent one or more similar colors with respect to the initial item 120. The color palette analysis may include one or more offline components 400 that generate the color similarity database 222 and one or more online components 410 that use the color similarity database 222 to determine the color similarity of two items. In the offline phase 400, images 401 may undergo background removal 402 and then be converted to an RGB vector 403. The images 401 may be normalized as discussed above. A machine learning model 404 such as a KMeans clustering model 404 may determine the top colors by percentage 405 in the image vectors. For example, the model 404 may be used to determine the top ten (or other configurable amount) of colors and their associated proportions. This color data may be used to populate the color similarity database 222.

In the online phase, a normalized image 411 for the initial item and a normalized image 412 for the candidate item may be used with the color similarity database 222 to determine the color similarity 420 for the initial item and candidate item. The color similarity database 222 may be queried for the two images' dominant colors and their proportions. Using this data from the database 222, the color similarity may be determined as follows:

$$Similarity_{color} = \sum_{top\_color=1}^{10} \left( W_{img_{1\_i}} - W_{img_{2\_i}} \right)$$
$$* \left( \sqrt{\left(R_{img_{1_i}} - R_{img_{2_i}}\right)^2 + \left(G_{img_{1_i}} - G_{img_{2_i}}\right)^2 + \left(B_{img_{1_i}} - B_{img_{2_i}}\right)^2} \right),$$

where $W_{img_{1\_i}}$ represents the initial item image's top i color channel's proportion, $W_{img_{1\_2}}$ represents the candidate item image's top i color channel's proportion, and the R, G, and B terms represent the red, green, and blue values for the initial item image and candidate item image.

Figure 5:
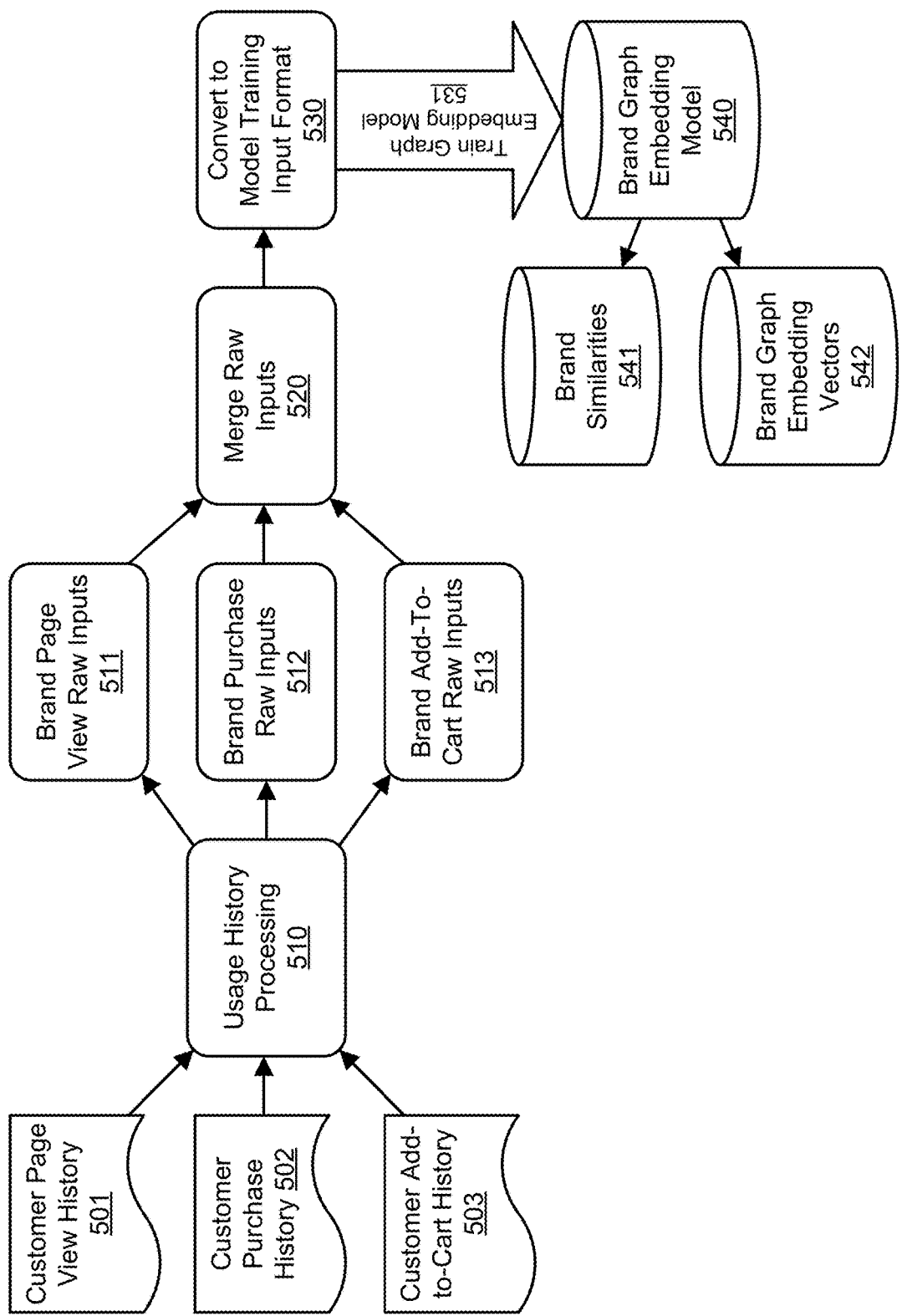
FIG. 5 illustrates further aspects of the example system environment for catalog item selection based on visual similarity, including brand affinity graph embedding, according to some embodiments.

FIG. 5 illustrates further aspects of the example system environment for catalog item selection based on visual similarity, including brand affinity graph embedding, according to some embodiments. The system 100 may maintain a brand affinity graph representing relationships between brands. Edges in the graph may be determined using customer usage histories for the catalog, e.g., customer page view or browse histories 501, customer purchase histories 502, customer add-to-cart histories 503, and so on. Information from the brand affinity graph may be used to prioritize and/or rank the candidate items such that items from brands with stronger affinities to the brand of the initial item 120 may be given higher prioritization. The various customer usage histories 501, 502, and 503 may be processes by a usage history processing component 510, e.g., to transform the usage logs into vertex-relation-vertex format. In the brand affinity graph, a node or vertex may represent a brand, and an edge or relation may represent a relationship (and strength) between two brands. Mutual page views, mutual purchases, or mutual add-items-to-cart for two different brands may increase the strength of the affinity between those brands. The vertex-relation-vertex data may be used to populate a set of raw inputs for brand page views 511, brand purchases 512, and brand add-to-cart 513. These raw inputs may be merged using the component 520, and the merged data may be converted to model training input format using the component 430. A training process 531 may produce a brand graph embedding model 540. The model 540 may include brand similarities 541 and brand graph embedding vectors 532.

Figure 6:
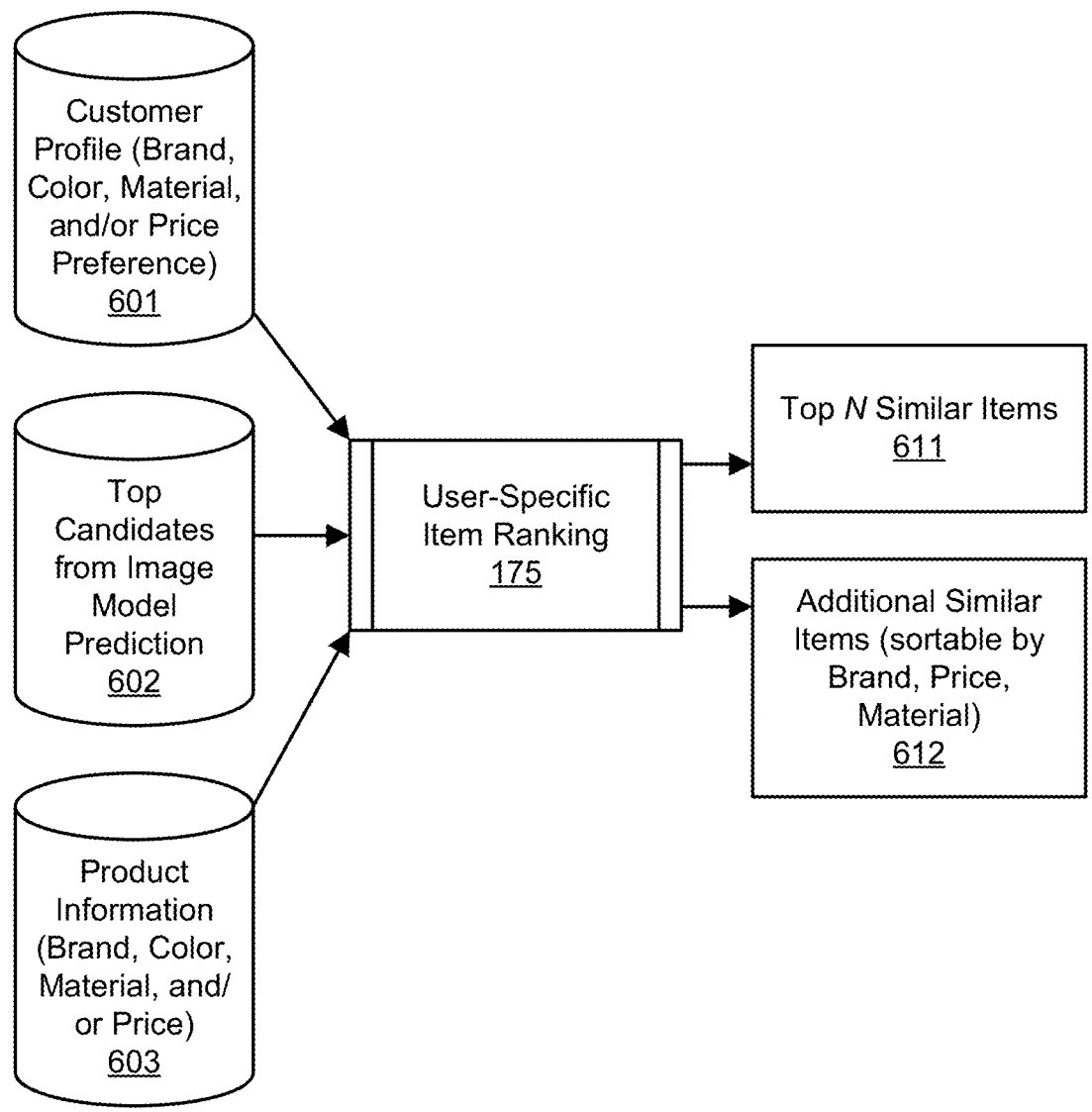
FIG. 6 illustrates further aspects of the example system environment for catalog item selection based on visual similarity, including personalized item ranking according to user preferences, according to some embodiments.

FIG. 6 illustrates further aspects of the example system environment for catalog item selection based on visual similarity, including personalized item ranking according to user preferences, according to some embodiments. In some embodiments, candidate items 150 may be ranked, prioritized, or filtered according to one or more other criteria, such as size, price, color, material, brand affinity, availability/buyability, and so on. For example, candidate items that are not available in a desired size (or unavailable to the user for any other reason) may be excluded from the set of visually similar items that is presented to the user. As another example, the user may have a range of acceptable prices, and candidate items that are not within that price range may be excluded from the set of visually similar items that is presented to the user. As shown in the example of FIG. 6, the user-specific item ranking 175 may use various inputs such as data 601 indicating a customer profile (e.g., brand, color, material, and/or price preferences), data 602 indicating the top candidate items from the image model prediction based on visual similarity, and data 603 indicating product information for the candidate items (e.g., brand, color, material, and/or price). The item ranking 175 according to the customer's preferences may produce a set of the top N similar items 611. The item ranking 175 according to the customer's preferences may also produce a set of additional similar items 612. The additional set 612 may be sortable by attributes such as brand, price, material, and so on.

Figure 7:
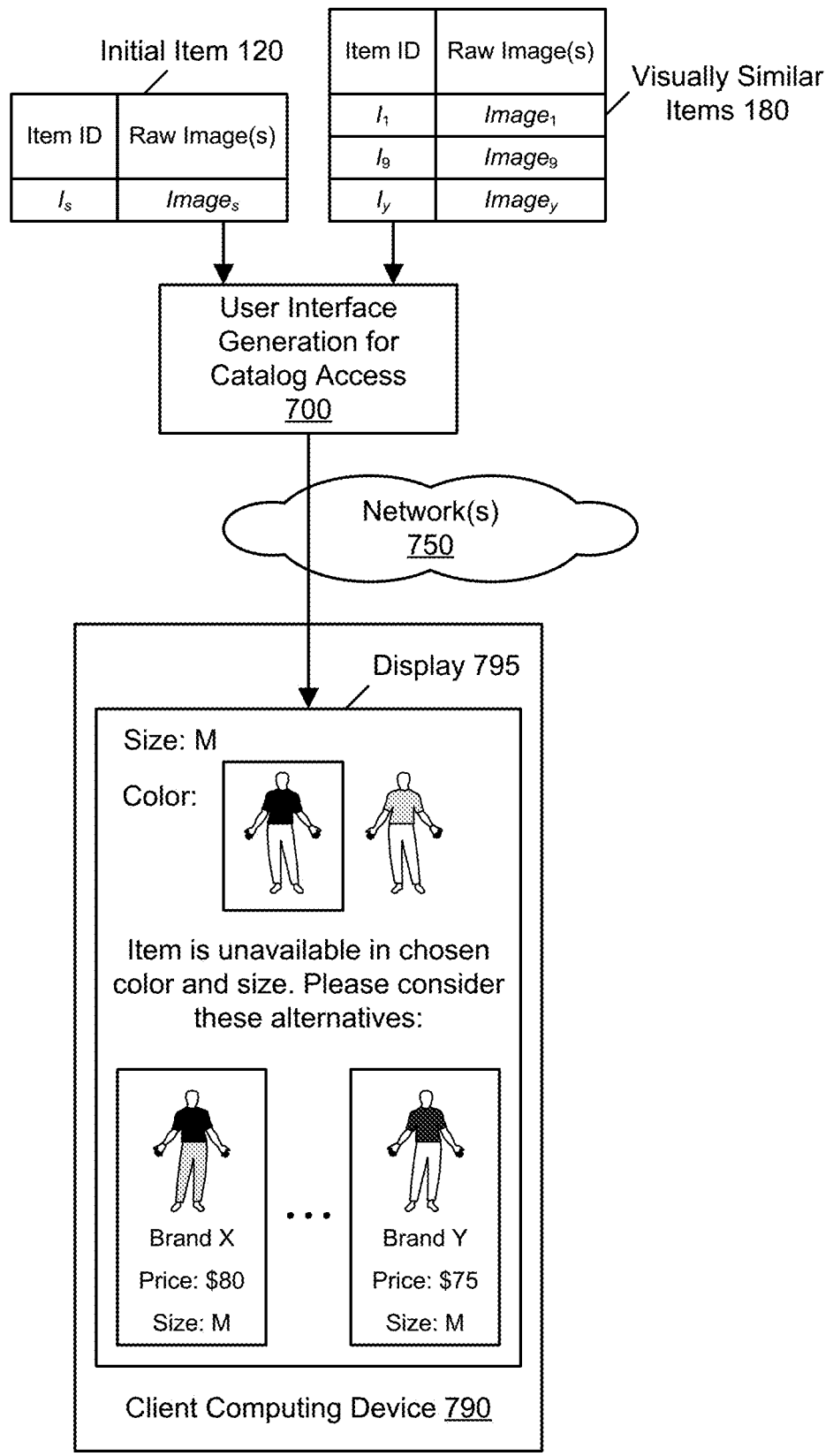
FIG. 7 illustrates further aspects of the example system environment for catalog item selection based on visual similarity, including an example of a user interface in which visually similar items are presented, according to some embodiments.

FIG. 7 illustrates further aspects of the example system environment for catalog item selection based on visual similarity, including an example of a user interface in which visually similar items are presented, according to some embodiments. In some embodiments, the similar items 180 may be used by a component for user interface generation for catalog access 700. The component 700 may be associated with a web server or other back-end system that generates a user interface that permits customers to search, browse, and make purchases from the electronic catalog 110.

The component 700 may represent one or more services in a service-oriented system that collaborate to produce user interface elements associated with the electronic catalog 110. For example, the component 700 may generate a "suggested purchases" or "recommended products" pane or widget on a product detail page associated with the electronic catalog 110, e.g., the product detail page for the initial item 120.

The resulting interface element may be displayed on a display device 795 associated with a client computing device 790 operated by a customer of the electronic catalog. The interface element or its contents may be sent to the client computing device 790 via one or more networks 750, e.g., the Internet. As shown in the example of FIG. 7, if the user has selected an item (e.g., a men's short-sleeved shirt) having a particular size (e.g., M) and color (e.g., black), but the item is unavailable in that combination of size and color, then the system 100 may be used to determine the set of visually similar items 180. The display 795 may show a message such as "Item is unavailable in chosen color and size. Please consider these alternatives:" along with images of at least some of the visually similar items 180. For example, the displayed similar items 180 may include a men's black short-sleeved shirt in size M from a different brand (Brand X) than the initial item and having a price of $80. As another example, the displayed similar items 180 may also include a men's dark gray short-sleeved shirt in size M from yet another brand (Brand Y) and having a price of $75. The similar items 180 may be selected in order to optimize the display of a relatively small number of suggested items in a space-constrained user interface element, e.g., having a limited number of "slots" for products. Such an interface element may improve the experience of customers of the electronic catalog, e.g., by allowing them to discover items they would have a higher propensity to purchase while reducing the display of irrelevant items.

In some embodiments, accurate item sizes may be determined using physical measurements of users along with machine learning techniques. For example, the user may supply her or his height and weight. An accurate sizing component of the catalog 110 may determine a body model for the user based (at least in part) on the physical measurements. The body model may be determined based (at least in part) on an estimated body mass index (BMI) of the user. In some embodiments, additional physical dimensions may be estimated for the user using the selected body model, such as a chest dimension, a neck dimension, an arm dimension, a waist dimension, a hip dimension, a leg dimension, and so on. These dimensions may be used as input to a machine learning model that generates size recommendations for individual users. The machine learning model may be continuously or periodically updated using responses to size recommendations. For example, if a user does not return an article of clothing within a predetermined timeframe, it may be assumed that the size recommendation was accurate, and this conclusion may be used to update the machine learning model.

Figure 8:
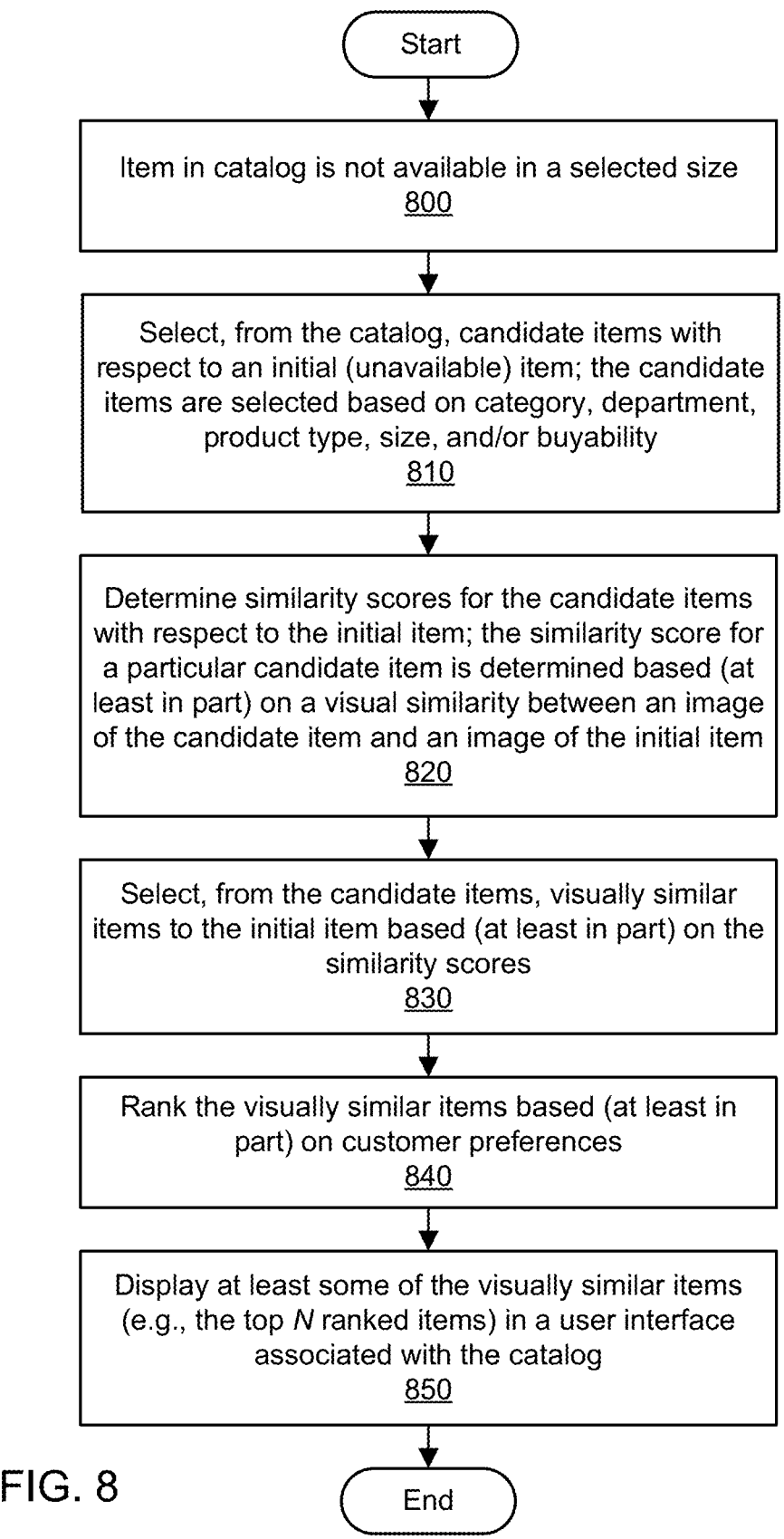
FIG. 8 is a flowchart illustrating a method for catalog item selection based on visual similarity, according to some embodiments.

FIG. 8 is a flowchart illustrating a method for catalog item selection based on visual similarity, according to some embodiments. As shown in 800, a customer of an electronic catalog may view an item that is not available for that customer, e.g., in a chosen size. The unavailable item may be referred to as an initial item. For example, the initial item may represent an article of clothing, and the article of clothing may be unavailable (e.g., out of stock or not offered) in a selected size associated with a customer. As another example, the initial item may be unavailable to the particular user for geographic, legal, regulatory, or other reasons, e.g., because a vendor of the item does not sell to particular locales.

As shown in 810, a plurality of candidate items may be selected from the catalog. The candidate items may be selected based on their category (e.g., the same category as the initial item), department (e.g., the same department as the initial item), product type (e.g., the same product type as the initial item), size (e.g., a selected size for a particular customer), availability/buyability, and so on. The candidate items may be selected such that they are both available to the user and broadly relevant to the user's interests. The candidate items may represent a much smaller set than the set of all items in the catalog. By performing analysis of visual similarity on a smaller set of candidate items rather than the entire catalog, the method may conserve the use of computational resources and return results with a much shorter latency.

As shown in 820, similarity scores may be determined for the candidate items. For a particular candidate item, the similarity score may be determined based (at least in part) on a visual similarity between an image of the candidate item and an image of the initial item. A machine learning model such as a neural network may be used to generate the similarity scores. The model may be trained using product images from the same brand and product type as the initial item. To ensure that comparisons are made between comparable images, product images may be normalized. Normalized images may be modified to have standard dimensions and/or a standard color depth. Normalized images may be generated by removing irrelevant image elements and isolating image elements of the products themselves. For example, for clothing items, image elements such as limbs, hands, necks, heads, or other exposed parts of human models may be identified and removed in the normalized images. In some embodiments, the normalized images may have backgrounds in the same color (e.g., black). Machine learning techniques may be used to identify parts of models and other extraneous elements in product images.

As shown in 830, one or more visually similar items may be selected from the candidate items based (at least in part) on the similarity scores. In some embodiments, the candidate items above a particular threshold value of the similarity score (e.g., at least 50% similar) or meeting some other criteria may be added to the set of visually similar items, and the remaining candidate items may be disregarded for inclusion in the set of visually similar items. In some embodiments, the top N candidate items in the ranking of the similarity scores may be added to the set of visually similar items, and the remaining candidate items may be disregarded for inclusion in the set of visually similar items.

As shown in 840, the visually similar items may be ranked, prioritized, and/or filtered based (at least in part) on the preferences of the customer. In some embodiments, the set of visually similar items may be ranked according to various attributes such as brand, color, material, and price range, where the various attributes are weighted according to analysis of the customer's usage history (e.g., page views, items added to cart, items purchased). For example, the user may have a range of acceptable prices, and candidate items that are not within that price range may be excluded from the set of visually similar items that is ultimately presented to the user.

As shown in 850, at least some of the visually similar items may be displayed in a user interface associated with the catalog. The visually similar items may be selected in order to optimize the display of a relatively small number of suggested items in a space-constrained user interface element. For example, the visually similar items may be used to drive a "suggested purchases" pane or widget on a product detail page of the initial item. Such an interface element may improve the experience of customers of the catalog, e.g., by allowing them to view and purchase items of interest while reducing the display of less relevant items.

Illustrative Computer System

In at least some embodiments, a computer system that implements a portion or all of one or more of the technologies described herein may include a computer system that includes or is configured to access one or more computer-readable media. FIG. 9 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 9 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more processors and one or more memories to store computer-executable instructions that, when executed, cause the one or more processors to:
        receive, via a user interface, a request to view an initial item in an electronic catalog;
        determine that the initial item is unavailable;
        select a plurality of candidate items with respect to the initial item in the electronic catalog, wherein the electronic catalog comprises an image of the initial item and respective images of the candidate items, and wherein the candidate items are selected from one or more item categories in which the initial item is classified;
        generate a plurality of normalized images for respective ones of the images of the candidate items, wherein generation of a normalized image for an individual image of a candidate item includes to:
            recognize objects in the individual image and identify respective classes of the objects;
            determine that the objects are not part of the candidate item based at least in part on the respective classes of the objects; and
            remove the objects to isolate the candidate item in the normalized image;
        determine respective similarity scores for at least a portion of the candidate items with respect to the initial item, wherein the respective similarity scores are determined using a machine learning model, and wherein the machine learning model is trained to assess a visual similarity of two items based on respective normalized images of the two items and produce a similarity score for the two items;
        select, from the candidate items, a set of visually similar items to the initial item based at least in part on a ranking of the respective similarity scores, wherein the visually similar items are available; and
        update the user interface to display a user interface element descriptive of at least some of the set of visually similar items.

2. The system as recited in claim 1, wherein the normalized images are generated to have standard dimensions and a standard color depth or format.

3. The system as recited in claim 1, wherein the one or more memories store additional computer-executable instructions that, when executed, cause the one or more processors to:
    extract a color palette of the image of the initial item; and
    extract respective color palettes of the respective images of the candidate items;
    wherein the set of visually similar items is selected based at least in part on the color palette of the image of the initial item and the respective color palettes of the respective images of the candidate items.

4. The system as recited in claim 1, wherein the one or more memories store additional computer-executable instructions that, when executed, cause the one or more processors to:
    determine a graph comprising a plurality of nodes and a plurality of edges, wherein the nodes represent a plurality of brands associated with the items in the catalog, wherein the edges represent relationships between pairs of the brands, wherein the relationships between the pairs of the brands are determined based at least in part on a plurality of customer usage histories for the catalog, and wherein the set of visually similar items is selected based at least in part on a brand affinity represented by the graph.

5. A computer-implemented method, comprising:
    receiving, via a user interface, a request to view an initial item in a catalog;
    determining that the initial item is unavailable;
    selecting, by a similarity detection system, a plurality of candidate items with respect to the initial item in the catalog, wherein the catalog comprises an image of the initial item and respective images of the candidate items, and wherein the candidate items are selected from one or more item categories in which the initial item is classified;
    generating, by the similarity detection system, a plurality of normalized images for respective ones of the images of the candidate items, wherein generating a normalized image for an individual image of a candidate item includes:
        recognizing objects in the individual image and identifying respective classes of the objects;
        determining that the objects are not part of the candidate item based at least in part on the respective classes of the objects; and
        removing the objects to isolate the candidate item in the normalized image;
    determining, by the similarity detection system, respective similarity scores for at least a portion of the candidate items with respect to the initial item, wherein the respective similarity scores are determined using a machine learning model trained to assess a visual similarity of two items based on respective normalized images of the two items and produce a similarity score for the two items;

selecting, by the similarity detection system from the candidate items, a set of visually similar items to the initial item based at least in part on the respective similarity scores, wherein the visually similar items are available; and updating the user interface to display at least some of the set of visually similar items.

6. The method as recited in claim 5, wherein the objects removed in the normalized image includes one or more textual labels, brand logos, or marketing graphics that are not on the candidate item.

7. The method as recited in claim 5, further comprising:
extracting a color palette of the image of the initial item; and
extracting respective color palettes of the respective images of the candidate items;
wherein the set of visually similar items is selected based at least in part on the color palette of the image of the initial item and the respective color palettes of the respective images of the candidate items.

8. The method as recited in claim 5, further comprising:
determining a graph comprising a plurality of nodes and a plurality of edges, wherein the nodes represent a plurality of brands associated with the items in the catalog, wherein the edges represent relationships between pairs of the brands, wherein the relationships between the pairs of the brands are determined based at least in part on a plurality of customer usage histories for the catalog, and wherein the set of visually similar items is selected based at least in part on a brand affinity represented by the graph.

9. The method as recited in claim 5, wherein the initial item is unavailable in a particular size, and wherein the set of visually similar items is selected based at least in part on availability of the visually similar items in the particular size.

10. The method as recited in claim 5, wherein the set of visually similar items is selected based at least in part on a ranking of the visually similar items, and the ranking is determined based at least in part on the respective similarity scores of the visually similar items and respective prices of the visually similar items.

11. The method as recited in claim 5, wherein the machine learning model is a neural network trained using a plurality of images from the catalog.

12. The method as recited in claim 5, further comprising:
identifying, for the initial item, one or more visually similar items in an additional catalog based at least in part on a visual similarity with the initial item;
extracting one or more attributes of the one or more visually similar items in the additional catalog; and
modifying the catalog using the one or more attributes of the one or more visually similar items in the additional catalog.

13. One or more non-transitory computer-readable storage media storing program instructions that, when executed on or across one or more processors, perform:
receiving, via a user interface, a request to view an initial item in a catalog;
determining that the initial item is unavailable in an item attribute;
selecting a plurality of candidate items with respect to the initial item in the catalog, wherein the catalog comprises an image of the initial item and respective images of the candidate items, and wherein the candidate items are selected from one or more item categories in which the initial item is classified;

generating a plurality of normalized images for respective ones of the images of the candidate items, wherein generating a normalized image for an individual image of a candidate item includes:
recognizing objects in the individual image and identifying respective classes of the objects;
determining that the objects are not part of the candidate item based at least in part on the respective classes of the objects; and
removing the objects to isolate the candidate item in the normalized image;

determining respective similarity scores for at least a portion of the candidate items with respect to the initial item, wherein the respective similarity scores are determined using a machine learning model trained to assess a visual similarity of two items based on respective images of the two items and produce a similarity score for the two items;

selecting, from the candidate items, a set of visually similar items to the initial item based at least in part on the respective similarity scores, wherein the visually similar items are available in the item attribute associated with the user; and updating the user interface to display a user interface element descriptive of at least some of the set of visually similar items.

14. The one or more non-transitory computer-readable storage media as recited in claim 13, wherein the respective classes of the objects are identified using a machine learned object classifier.

15. The one or more non-transitory computer-readable storage media as recited in claim 13, further comprising additional program instructions that, when executed on or across the one or more processors, perform:
extracting a color palette of the image of the initial item; and
extracting respective color palettes of the respective images of the candidate items;
wherein the set of visually similar items is selected based at least in part on the color palette of the image of the initial item and the respective color palettes of the respective images of the candidate items.

16. The one or more non-transitory computer-readable storage media as recited in claim 13, further comprising additional program instructions that, when executed on or across the one or more processors, perform:
determining a graph comprising a plurality of nodes and a plurality of edges, wherein the nodes represent a plurality of brands associated with the items in the catalog, wherein the edges represent relationships between pairs of the brands, wherein the relationships between the pairs of the brands are determined based at least in part on a plurality of customer usage histories for the catalog, and wherein the set of visually similar items is selected based at least in part on a brand affinity represented by the graph.

17. The one or more non-transitory computer-readable storage media as recited in claim 13, wherein the initial item is unavailable in a particular size, and wherein the set of visually similar items is selected based at least in part on availability of the visually similar items in the particular size.

18. The one or more non-transitory computer-readable storage media as recited in claim 13, wherein the set of visually similar items comprises a plurality of child product identifiers, wherein the child product identifiers represent children of one or more parent product identifiers.

19. The one or more non-transitory computer-readable storage media as recited in claim 13, further comprising additional program instructions that, when executed on or across the one or more processors, perform:

training a neural network using a plurality of images from the catalog, wherein the respective similarity scores are determined using the neural network.

20. The one or more non-transitory computer-readable storage media as recited in claim 13, further comprising additional program instructions that, when executed on or across the one or more processors, perform:

identifying, for the initial item, one or more visually similar items in an additional catalog based at least in part on a visual similarity with the initial item;

extracting one or more attributes of the one or more visually similar items in the additional catalog; and modifying the catalog using the one or more attributes of the one or more visually similar items in the additional catalog.

\* \* \* \* \*